United States Patent [19]

Frank et al.

[11] Patent Number: 4,518,411
[45] Date of Patent: May 21, 1985

[54] SHAPING GLASS SHEETS TO COMPLICATED SHAPES USING SPECIAL LIFT MOLD

[75] Inventors: Robert G. Frank, Murrysville; Michael T. Fecik, Pittsburgh; George R. Claassen, New Kensington, all of Pa.

[73] Assignee: PPG Industries, Inc., Pittsburgh, Pa.

[21] Appl. No.: 538,057

[22] Filed: Sep. 30, 1983

[51] Int. Cl.³ .............................................. C03B 23/03
[52] U.S. Cl. ....................................... 65/106; 65/273; 65/287; 65/291
[58] Field of Search ................. 65/106, 273, 290, 291, 65/287

[56] References Cited

U.S. PATENT DOCUMENTS

| | | | |
|---|---|---|---|
| 3,374,077 | 3/1968 | Cypher | 65/104 |
| 3,374,080 | 3/1968 | Wheeler | 65/273 |
| 3,468,645 | 9/1969 | McMaster et al. | 65/25 |
| 3,586,492 | 6/1971 | McMaster | 65/287 |
| 3,607,200 | 9/1971 | McMaster | 65/182 |
| 3,700,425 | 10/1972 | McMaster | 65/348 |
| 3,756,797 | 9/1973 | Akeyoshi et al. | 65/25 A |
| 3,846,104 | 11/1974 | Seymour | 65/104 |
| 3,869,271 | 3/1975 | Shaffer et al. | 65/273 |
| 4,092,141 | 5/1978 | Frank et al. | 65/114 |
| 4,185,986 | 1/1980 | Frank | 65/287 |
| 4,187,095 | 2/1980 | Frank | 65/104 |
| 4,197,108 | 4/1980 | Frank et al. | 65/273 |
| 4,202,681 | 5/1980 | McMaster et al. | 65/104 |
| 4,204,853 | 5/1980 | Seymour | 65/106 |
| 4,204,854 | 5/1980 | McMaster et al. | 65/106 |
| 4,217,126 | 8/1980 | Hagedorn et al. | 65/291 X |
| 4,221,580 | 9/1980 | Frank | 65/273 |
| 4,227,908 | 10/1980 | Seymour | 65/106 |
| 4,229,199 | 10/1980 | Seymour | 65/106 |
| 4,229,200 | 10/1980 | Seymour | 65/106 |
| 4,233,049 | 11/1980 | Seymour | 65/106 |
| 4,252,552 | 2/1981 | Frank | 65/106 |
| 4,272,274 | 6/1981 | Frank et al. | 65/273 |
| 4,280,828 | 7/1981 | Seymour | 65/106 |
| 4,282,026 | 8/1981 | McMaster et al. | 65/273 |
| 4,285,715 | 8/1981 | Frank | 65/106 |
| 4,298,368 | 11/1981 | Seymour | 65/25.2 |
| 4,300,935 | 11/1981 | Seymour | 65/107 |
| 4,331,464 | 5/1982 | Claasen et al. | 65/273 |
| 4,356,018 | 10/1982 | McMaster | 65/104 |
| 4,357,156 | 11/1982 | Seymour | 65/104 |
| 4,361,432 | 11/1982 | McMaster et al. | 65/104 |
| 4,364,765 | 12/1982 | McMaster et al. | 65/106 |
| 4,368,065 | 1/1983 | Frank | 65/114 |

Primary Examiner—Arthur Kellogg
Attorney, Agent, or Firm—Andrew C. Siminerio; Edward I. Mates

[57] ABSTRACT

Sheets of heat-deformable material, such as glass, are shaped to non-uniform curvatures that include a localized sharply bent portion near one side portion of the sheet by lifting the sheet while the latter is at a deformation temperature range on a lower lifting mold of special construction that includes spaced, transversely extending slats having upper edge surfaces defining the non-uniform bend and a longitudinally extending end slat whose upper edge surface defines a transverse curve that merges with the upper edge surfaces of said transversely extending slats.

13 Claims, 5 Drawing Figures

SHAPING GLASS SHEETS TO COMPLICATED SHAPES USING SPECIAL LIFT MOLD

BACKGROUND OF THE INVENTION

The present invention relates to the shaping of glass sheets and particularly to shaping sheets of glass and other deformable, transparent materials supported horizontally using a technique known by various terms, such as horizontal press bending, drop forming, and sag bending, in which a glass sheet is lifted on a lifting mold to a raised position for support by a vacuum holder and then transferred from the vacuum holder to a ring-like member that transports the glass sheet from a shaping station into a cooling station where a desired degree of temper is imparted to the shaped glass. In particular, the present invention relates to shaping sheets to non-uniform configurations comprising a relatively sharp bend near one side and a relatively shallow bend away from said one side.

DESCRIPTION OF TECHNICAL PROBLEMS AND PATENTS OF INTEREST

Glass sheets shaped to the configurations required for windows in automobiles have been mass produced at high rates by apparatus that conveys glass sheets in series while supported in a generally horizontal orientation through a tunnel-type furnace on one of several types of conveyors, such as roller conveyors or gas hearth type conveyors. During its passage through the furnace, each glass sheet in turn is heated to a temperature approaching the glass softening point. When the glass sheet reaches the proper temperature, either within the downstream end of the furnace or beyond the furnace exit, each glass sheet is brought into engagement with a vacuum holder, an outline ring-like member is shuttled into a position below the vacuum holder from a cooling area to receive a glass sheet from the vacuum holder and support the glass sheet near its peripheral margin for conveyance into the cooling area where cool blasts of tempering medium chill the supported glass sheet sufficiently rapidly to impart a desired degree of temper. The glass sheet is transferred from the shuttling ring-like member onto a removal conveyor and the ring-like member is returned to a position adjacent the vacuum holder to await the arrival of a succeeding glass sheet into a position of engagement with the vacuum holder.

Glass sheets have been lifted at a shaping station by vacuum by lowering a vacuum mold having either an essentially flat or gently bent apertured lower wall into close adjacency to the upper surface of a flat heat-softened glass sheet and then lifting the vacuum engaged glass sheet with the mold sufficiently high to provide a clearance space for entry of the ring-like member that shuttles between a position below the lifted vacuum mold where the sheet is transferred from the lifted vacuum mold to the ring-like member and a cooling station where blasts of cool tempering medium cool the sheet supported on the ring-like member sufficiently rapidly to impart a desired degree of temper in the glass. However, for practical purposes, the shape of the lower wall of the upper vacuum mold cannot depart too much from the flat shape of the glass sheet arriving at the shaping station without introducing problems involving engaging the glass sheet for lifting. Deformable vacuum molds have been developed that move into a lowered position with their lower walls unstressed to conform to the flat glass sheet shape and then are distorted with the heat-softened glass sheet engaged thereagainst by vacuum during their lifting so that the sheet develops the distorted shape of the mold. This technique works fine for certain shapes, but has not been used successfully for certain extreme shapes.

Flat glass sheets have been lifted on outline molds or on spaced lifting members whose upper edge surfaces define a shape to be imparted to the glass sheets while lifted toward a vacuum mold having a downwardly facing wall of either identical or approximately the configuration defined by the lifting members. Outline molds develop uncontrolled sag within the perimeter of the heat-softened sheet that is lifted. Spaced lifting members develop a defect known as "pie crust" to be explained later.

When glass sheets are delivered to a shaping station on spaced conveyor rolls to be lifted therefrom toward an upper vacuum mold, the prior art lifting mechanism was discontinuous to enable it to move through the positions occupied by the spaced conveyor rolls. When a heat-softened sheet is lifted on shaped lifting members whose upper surfaces define a shaping surface that engages an edge portion of the sheet, the edge portion of the lifted sheet develops a scalloped or wavy appearance along its edge due to the spaces between the adjacent lifting members. This wavy appearance along an edge is termed "pie crust" by those in the art.

Pie crust becomes increasingly severe as the height through which the edge portion is lifted on spaced lifting members relative to the main portion of the sheet increases. In addition, pie crust also is affected as the width of the edge portion measured from the sheet edge to its axis of sharp bending changes. Pie crust is also affected by the severity of bend applied to a sharply bent edge portion. Consequently, when it became necessary to shape glass sheets to a non-uniform shape comprising a sharply bent end portion and a shallower bend remote from the sharply bent portion, the lifted edge of bent sheets adjacent the sharply bent portion was characterized by severe pie crust to the extent that it was difficult to mount a glass sheet bent to such a complex shape within a curved frame for which it was designed to be glazed. Pie crust also was so severe that it caused a distorted optical pattern which made it very difficult for occupants of a motor vehicle to look through a window so shaped.

The pie crust developed from lifting a heat-softened sheet on a lifting mechanism comprising spaced lifting members that engage the sheet across or near its peripheral edge portion could not be corrected by engaging the lifted sheet with the scalloped edge by suction against an upper vacuum mold. Attempts to reduce the severity of pie crust by limiting the maximum temperature to which the sheet was heated resulted in limiting the maximum temper that could be attained and even caused some breakage. Attempts to correct pie crust by changing the duration of exposure of the lifted sheet to simultaneous engagement between an upper vacuum mold and lifting members showed no significant reduction in severity of pie crust. Attempts to correct pie crust by changing the minimum gap between the upper vacuum mold and the lower lifting members failed because breakage tended to develop when the gap was reduced too much and loss of bend compliance developed even in areas other than the sharply bent region when the minimum gap was increased to too large a gap.

U.S. Pat. No. 3,468,645 to McMaster et al. discloses a glass sheet shaping apparatus that comprises an open-centered, endless loop frame for engaging the periphery of a fluid supported sheet and lifting the sheet to urge the latter against an upper vacuum mold. The loop frame then carries a shaped sheet to a cooling station for tempering. The glass sheet portion inward of the endless loop frame is free to sag away from the shape desired for the bent glass sheet. Other patents that show the combination of a mechanical lifting device with a vacuum mold include U.S. Pat. Nos. 3,586,492 to McMaster; 3,607,200 to McMaster; 3,700,425 to McMaster, 3,846,104 to Seymour; 3,869,271 to Shaffer et al.; 4,092,141 to Frank et al.; 4,185,986 to Frank; 4,187,095 to Frank; 4,197,108 to Frank et al.; 4,202,681 to McMaster et al.; 4,204,853 to Seymour; 4,204,854 to McMaster et al.; 4,221,580 to Frank; 4,227,908 to Seymour; 4,229,199 to Seymour; 4,229,200 to Seymour; 4,233,049 to Seymour; 4,252,552 to Frank; 4,272,274 to Frank et al.; 4,280,828 to Seymour; 4,282,026 to McMaster et al.; 4,285,715 to Frank; 4,298,368 to Seymour; 4,300,935 to Seymour; 4,331,464 to Claassen et al.; 4,356,018 to McMaster; 4,357,156 to Seymour; 4,361,432 to McMaster et al.; 4,364,765 to McMaster et al.; and 4,368,065 to Frank.

In some of these patents, an outline frame type mold lifts a glass sheet to a position near an upper vacuum mold with consequent loss of shape control inwardly of the lifting mold. In other of the patents cited, the lifting means comprises a plurality of bars or slats that extend entirely across a dimension of the glass sheet and are potential sources of pie crust along an edge of a bent glass sheet, particularly when the desired shape comprises an end portion sharply bent about an axis of sharp bending.

Glass sheets are also shaped by gravity sagging. U.S. Pat. No. 3,756,797 to Akeyoshi et al. uses a glass sheet shaping mold of the lattice type. The upper edge surfaces of the slats forming the lattice are located along a curved surface conforming to the shape to which a heated glass sheet is to sag. The lattice is unitary with a mold frame so that it is necessary to replace a lattice-type mold conforming to one production pattern including its mold frame with one of a different production pattern including its mold frame whenever a change of production takes place. This patent does not include any upward lifting of the glass to engage a vacuum mold.

At the time of this invention, the glass sheet bending art lacked a suitable method and apparatus for shaping sheets to a shape that included a relatively narrow edge portion bent sharply relative to a main sheet portion that avoided both excessive sag and pie crust.

SUMMARY OF THE INVENTION

The present invention provides method and apparatus for bending glass sheets to complicated shapes including an end portion bent sharply relative to a main portion. Apparatus conforming to this invention incorporates a vacuum holder and also includes movable means in the form of a special lifting mold whose glass engaging surface has the appearance of a comb in plan view and a non-uniform shape in transverse elevation to help impart a sharp localized bend to a glass sheet undergoing shaping by such apparatus. The movable lifting mold is supported and moved by means that keeps the lifting mold below a path of glass sheet movement when a glass sheet moves into a shaping station below the vacuum mold. Then, the lifting mold engages and lifts the glass sheet including full surface contact along a side edge portion thereof that requires sharp bending into close proximity to the upper vacuum mold. At this time, vacuum applied to the vacuum mold engages the lifted sheet thereagainst. In the method of this invention, the main portion of a hot glass sheet is lifted toward an upper vacuum mold after its arrival from a heating furnace into a shaping station along a path of movement. Elongated, parallel shaping members in the form of slats extending between parallel spaces, engage spaced, parallel elongated areas of the glass sheet as the lifting mold rises above the plane occupied by the conveyor means that defines said path. An elongated edge slat which interconnects the relatively sharply bent end portions of said parallel shaping slats provides a continuous elongated area of glass sheet support along an edge portion of the sheet being shaped in a direction transverse to the length of the parallel elongated areas that the slats engage.

In a preferred embodiment of this invention, the shaping station is located just beyond the furnace in an open atmosphere. The glass sheet is thus exposed to an atmosphere having a temperature lower than furnace temperature for a brief period on the order of a fraction to several seconds before the glass sheet is lifted from the conveyor rolls into vacuum engagement with the vacuum mold. Under such circumstances, the surface temperature of the glass sheet cools sufficiently for the surface to harden and withstand local deformations on engagement with solid shape-imparting members while the core of the glass sheet remains sufficiently high to enable the glass sheet to deform on lifting engagement with the spaced parallel shaping slats and the connecting end shaping slat. Another aspect of patentable subject matter involves the use of openings between adjacent shaping slats at their ends opposite the connecting end slat. These openings facilitate removal of the array of slats including the shaped, spaced, parallel shaping slats and the connecting end shaping slat from the rest of the lifting mold structure and its replacement with another array that conforms to a different production pattern without disturbing the conveyor means strucutre.

The benefits of the present invention will be understood more clearly in the light of a description of a preferred embodiment that follows.

DESCRIPTION OF THE PREFERRED EMBODIMENT

Referring to the drawings, an apparatus for heating and shaping sheets of heat-deformable material, such as glass, includes a heating means including a tunnel-type furnace 10 having a vertically movable exit door 12 through which sheets of glass are conveyed from a loading station (not shown) while being heated to the glass deformation temperature. A cooling station generally indicated at 14 for cooling the curved sheets of glass and an unloading station (not shown) beyond the cooling station 14 are located in end-to-end relation to the right of the furnace 12. An intermediate or shaping station 16 is disposed between the furnace 12 and the cooling station 14. A transfer means (not shown) located in the cooling station 14 transfers the shaped and tempered glass sheet to a downstream conveyor (not shown) for transport to the unloading station. A preferred transfer means for transferring bent, tempered glass sheets from apparatus embodying this invention is disclosed in U.S. Pat. No. 4,368,065 to Frank, the disclosure of which is incorporated herein by reference.

Heat may be supplied in the furnace 12 by hot gases from gas burners or by electrical radiant heaters or by a combination of both, which heat supply means are well known in the art. The apparatus includes a horizontal conveyor comprising longitudinally spaced, transversely extending conveyor rolls 18 that define a path of travel which extends through the furnace 12 and additional smaller diameter conveyor rolls 19 that define an extension of said path into the shaping station 16. The rolls of the conveyor are arranged in sections and their rotational speed controlled through clutches (not shown), and one or more drive chains 20, each coupled to a drive motor 21 so that the speed of the different conveyor sections may be controlled and synchronized in a manner well known in the art. A glass sensing element S is located before the exit door 12 to initiate a cycle of operation of this apparatus. In the further description that follows, the terms "longitudinal" and "transverse" are recited in terms of the longitudinal and transverse dimensions of the aforesaid path of travel.

A timer circuit is provided to synchronize the operation of various elements of the apparatus according to a predetermined sequence. The glass sensing element S and the timer circuit actuated thereby cooperate to provide synchronizing means for the apparatus of the present specification in a manner well known in this art.

Figure 1:
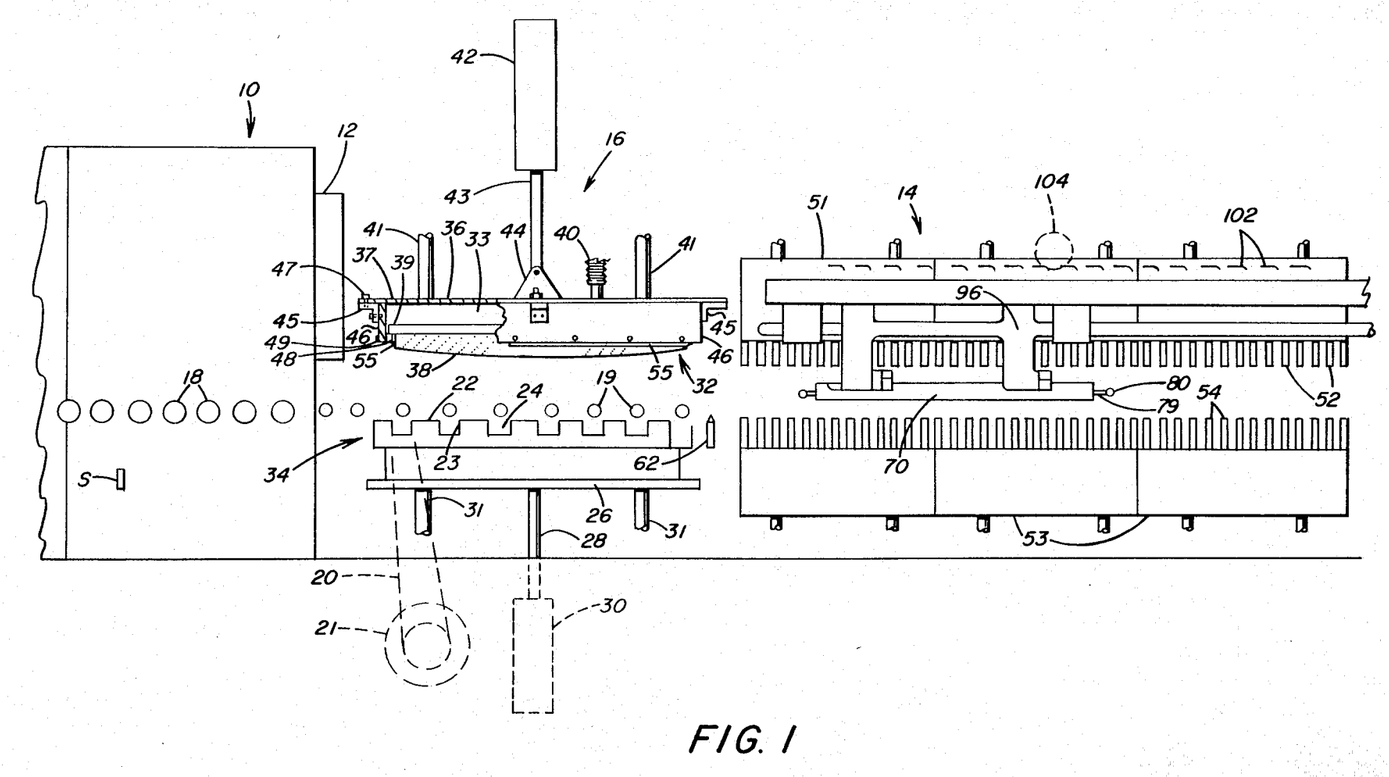
FIG. 1 is a fragmentary longitudinal view of a portion of a glass sheet shaping station, which includes a lifting mold conforming to the present invention, shown between an exit end of a heating furnace and an entrance end of a cooling station, with certain features removed in part to show other parts.

The shaping station 16 comprises an upper vacuum mold 32 enclosing a vacuum chamber 33 and a lower lifting mold 34. The upper mold 32 may be covered by a flexible fabric cover 35 of a refractory material, such as fiber glass, that does not harm heat-softened glass on pressurized engagement therewith.

The lower lifting mold 34 has an upper surface 22 conforming in elevational shape to a first shape desired for a glass sheet to be bent. The upper surface 22 is located at the upper ends of spaced, parallel elongated shaping members in the form of slats 23 extending across a dimension of the lower mold 34 transverse to said path extension. Slats 23 are spaced by transversely extending spaces 24 and are interconnected at one end by a longitudinal end slat 25. The spaces 24 provide clearance for raising and lowering the lower lifting mold 34 between a recessed position below the conveyor rolls 19, and a raised position above the level of said latter conveyor rolls. The lower lifting mold 34 is fixed to a lower mold support 26 and connected for upward movement toward the upper vacuum mold 32. Vertical grooves 27 are located below the upper surface of the longitudinal end slat 25.

Figure 2:
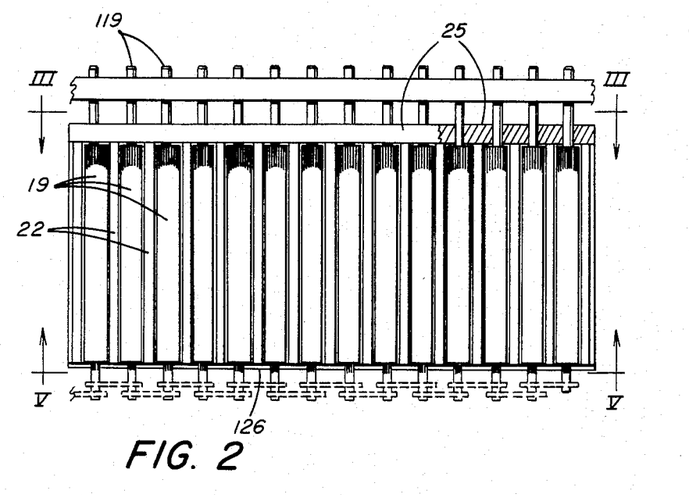
FIG. 2 is a plan view of the lifting mold forming part of the present invention in the shaping station, with certain parts removed in part to show other elements of the present invention more clearly.
Figure 3:
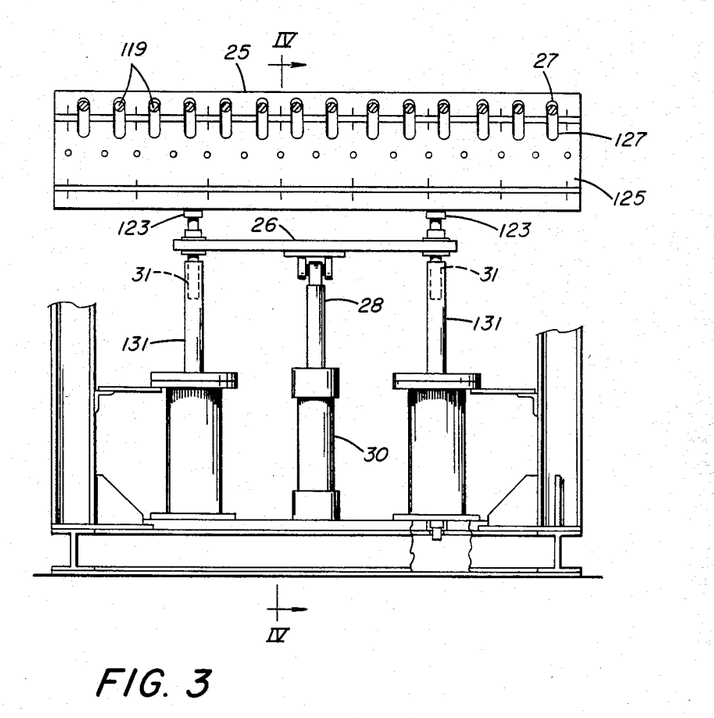
FIG. 3 is a longitudinal sectional view of the lifting mold, taken along the line III—III of FIG. 2.

Slats 23 have upper edge surfaces that define portions of the transverse shape to be imparted to a glass sheet. End slat 25 extends longitudinally continuously along the length of the lower lifting mold 34 and is shaped along its upper edge surface to define a sharply bent end portion in its width dimension. The end portions of the transverse slats 23 have their upper edge surfaces so shaped that their shapes merge into the shape defined along the width of the upper edge surface of end slat 25. The ends of slats 23 opposite those that abut end slat 25 are interconnected to a mold support 26 through a low vertically oriented, longitudinal, horizontally extending plate 126 that engages the lower portions only of slats 23.

Figure 4:
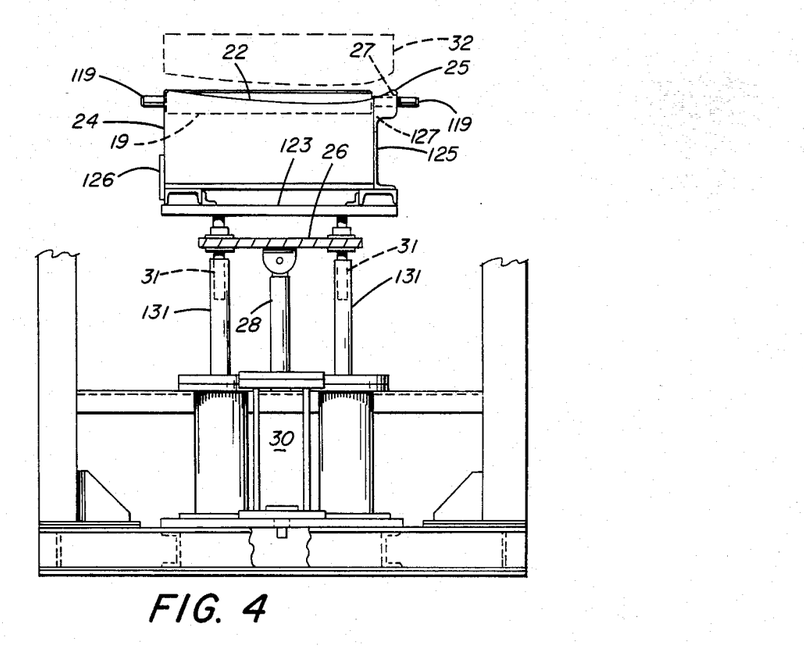
FIG. 4 is a transverse sectional view of the lifting mold, taken along the line IV—IV of FIG. 3.
Figure 5:
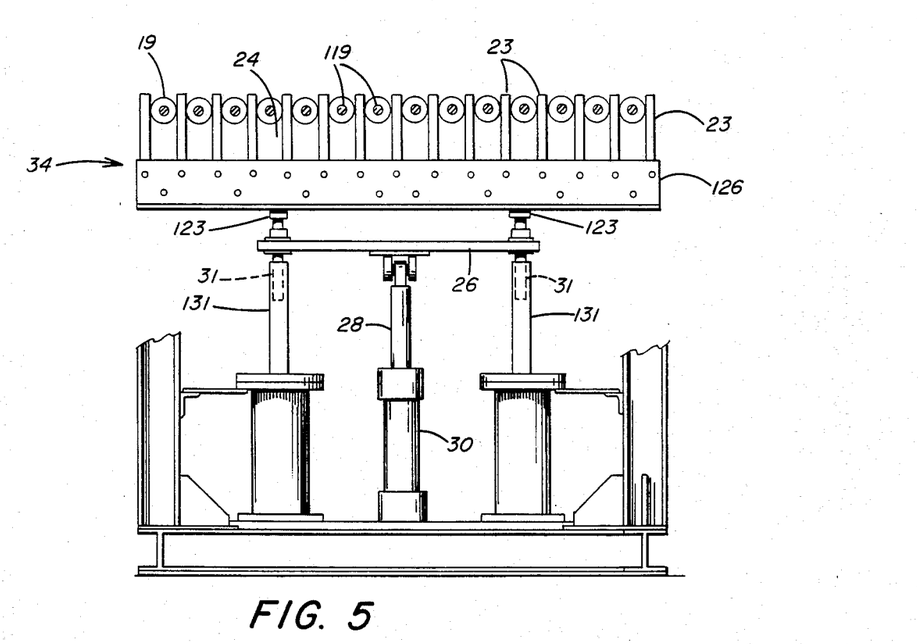
FIG. 5 is a longitudinal sectional view taken along the line V—V of FIG. 2.

The end slat 25 is fixed to the upper end of a longitudinally extending C-shaped channel member 125. Channel member 125 runs parallel to the low plate 126. Each vertical groove 27 of end slat 25 has a counterpart groove 127 in C-shaped channel member 125 that aligns with a corresponding groove 27 to provide an elongated vertical groove 27, 127 that receives corresponding reduced end portions 119 at one end of shaping station rolls 19. The other end portions 119 extend through the space over low plate 126.

The support 26 also supports angles and inverted channel members that help connect the C-shaped channel member 125 and low plate 126 thereto and cooperates to form a support structure for the slats 23 and end slat 25 of the lower lifting mold 34. A pair of spaced reinforcement members 123 are provided between C-shaped channel member 125 and plate 126 to reinforce the lower lifting mold 34.

The upper surfaces 22 of the transverse lands 23 and end land 25 of the lower lifting mold 34 are preferably smoothly surfaced to avoid imparting any irregularity in the supported glass sheet surface, are composed of a material that does not react with glass, are easily shaped to the smoothly surfaced contour desired and have good durability despite intermittent contact with hot glass that causes rapid cyclical temperature variations over an extended period. A good material for the transverse lands 23 is an alumino-silica cement sold by Johns-Manville under the trademark of TRANSITE®. If desired, the upper surface 22 of the elongated slats 23 of the lower lifting mold 34 may be covered with a flexible fabric cover of a refractory material, such as fiber glass, that does not harm heat-softened glass on pressurized engagement therewith. Such covering is preferably in the form of strips, one strip being applied to each land.

The end slat 25 is preferably composed of a rigid metal such as aluminum about 3 inches (7.6 centimeters) thick and wide having its upper edge surface covered with a thin, flexible coating of an aramid fiber about 1/16 inch (1.6 millimeters) thick. The latter is available commercially as Klingersil 4400-C, sold by Richard Klinger, Inc., Sidney, Ohio. The upper surface of end slat 25 is transversely curved to be a continuation of the discontinuous shaping surface provided by the upper shaping surfaces 22 of the transverse lands 23.

Raising and lowering means in the form of one or more lower piston rods 28, each movably mounted to a rigidly supported piston cylinder 30, raises and lowers support 26 and its attached lower lifting mold 34 a limited distance. Alignment posts 31 are attached to mold support 26 to move the lower lifting mold 34 vertically. The alignment posts 31 move vertically through alignment sleeves 131 mounted to a supporting framework for the shaping apparatus in a manner well known in the art.

The upper vacuum mold 32 comprises an inverted metal box 36 having an upper metal wall member 37, and a lower refractory wall member 38 that is apertured. The lower wall member is provided with an outwardly extending ledge portion 39 that is about 1 inch (2.54 centimers) thick and about ¾ inch (1.9 centimeters) wide. The lower wall member 38 has its downwardly facing surface shaped to correspond essentially to the shaping surface formed by the upper shaping surface 22 defined by elongated slats 23 and end slat 25 of the lower lifting mold 34.

The upper vacuum mold 32 forms the chamber 33, between the upper metal wall member 37 and the lower wall member 38, that communicates with a source of vacuum (not shown) through an evacuation pipe 40 and a suitable valve (not shown). The upper vacuum mold 32 is suitably connected through upper vertical guide rods 41 to an upper supporting frame (not shown) which supports an upper vertical piston 42 and is movable relative to the upper supporting frame by an upper vertical piston rod 43 mounted in piston 42 and a clevis connection 44 to the upper wall member 37. The evacuation pipe 40 may be selectively connected through a suitable valve arrangement to a source of pressurized air (not shown) and the valves for the vacuum line and for the pressure line may be synchronized according to a predetermined time cycle in a manner well known in the art to effect a vacuum in chamber 33 when the upper mold 32 engages a glass sheet and to promote superatmospheric pressure in chamber 33 in order to assist release of the glass sheet from engagement against the upper vacuum mold 32. As an alternative, the upper wall member 37 may be apertured to receive a pressure feed pipe connected via suitable valving to a pressurized air source independently of evacuation pipe 40.

A plurality of angle irons 45 is spaced along the longitudinal and transverse side edges of the upper metal wall member 37. Each angle iron has a horizontal flange fixed to the upper metal wall member 37 and a vertical flange attached to internally threaded, essentially vertical metal wall portions 46 by bolts 47. The upper metal wall member 37 cooperates with the vertical metal wall portions 46 to form the inverted metal box 36.

A circumferentially extending ledge 48 having longitudinally extending side ledge portions interconnected by transversely extending end ledge portions, extends inward from the wall portions 46. Preferably the ledge is composed of abutting metal bars 1 inch (2.54 centimeters) square in cross section to provide a rigid supporting surface for the ledge portion 39 of lower refractory wall member 38 that overlaps it. In this manner, additional bolts 49 secure the circumferential ledge 48 to the vertical wall portions 46 through internally threaded recesses in the wall portions 46. The peripheral ledge 48 is constructed and arranged to provide an inwardly extending support 1 inch (2.5 centimeters) wide and 1 inch (2.54 centimeters) thick that supports the outwardly extending ledge portion 39 of the lower refractory wall member 38 in partially overlapping relation to permit room for thermal expansion between peripheral ledge 48 and ledge portion 39.

The vacuum chamber 33 formed between the upper metal wall member 37 and the lower refractory wall member 38 is enclosed within the vertical wall portions 46. In order to replace a lower refractory wall member 38 corresponding to one production pattern with one corresponding to another production pattern, the bolts 47 that secure the horizontal flanges of angle irons 45, fixed to one of the vertical wall portions 46 (preferably a longer wall portion if the vertical wall portions define a rectangular shape), to the upper metal wall member 37 are loosened and removed. The loosened lower refractory wall member 38 is removed from the inverted metal box 36 through the opening provided by removing the vertical wall portion 46. In order to facilitate this removal, the ledge portion 39 is slightly narrower and slightly shorter than the circumferential, inwardly extending ledge 48 to provide clearance for its removal and installation, but wider and longer than the area defined by the inner margin of the circumferential, inwardly extending ledge 48 to provide adequate support. After its removal, another lower refractory wall member 38 conforming to the new production pattern but having an essentially identical circumferential, outwardly extending ledge portion 39 as that of the removed lower refractory wall member 38, is inserted within the vacuum chamber to have its outwardly extending ledge portion 39 rest on the ledge 48.

The previously removed vertical wall portion 46 is replaced to close the vacuum chamber 33. To accomplish this, the vertical wall portion 46 and its attached angle irons 45 are placed in the proper position and bolts 47 tightened to fasten the horizontal flange of each angle iron to the upper metal wall member 37. The apparatus is now ready to produce a different pattern after a flexible, air impervious, stretchable tape 55 is applied around the peripheral joint between the lower refractory wall member 38 and the lower surface of the circumferentially extending ledge 48 to provide a peripheral, stretchable gasket means therearound. A typical preferred type of a thermosetting, pressure sensitive adhesive tape is a fiberglass cloth electrical tape that is sold by Minnesota Mining and Manufacturing (3M) under the Scotch #27 trademark in ½ inch (1.27 centimeters) width. However, usually this flexible adhesive tape gasket is not necessary and its use is optional.

The specific details of the upper vacuum mold 32 just described are disclosed and claimed in copending U.S. Patent application Ser. No. 532,422 of Robert G. Frank, Michael T. Fecik and John J. Ewing, filed Sept. 15, 1983, For Vacuum Mold For Shaping Glass Sheets. While other embodiments of vacuum mold may be employed with apparatus conforming to the present invention, the apparatus of the copending patent application represents the best embodiment at present and a detailed description thereof is incorporated in this specification to disclose a preferred embodiment.

The apertures in the apertured lower wall member 38 are made as small as possible and are spaced as closely as is necessary to assure vacuum support for a hot glass sheet with reasonable energy consumption. For an upper vacuum mold having a glass sheet engaging apertured lower wall member 38 with dimensions 46 inches (117 centimeters) long and 22 inches (56 centimeters) wide, apertures having a diameter of 0.09 inches (0.23 centimeters) and spaced apart from one another 1.5 inches (3.8 centimeters) in a retangular or diamond pattern have been found to work adequately in handling glass sheets whose weight is up to 20 pounds (9 kilograms). The apertures extend through the entire thickness of the downwardly facing apertured wall member 38.

The cooling station 14 comprises several upper plenum chambers 51, each provided with longitudinally spaced transverse rows of transversely spaced pipe nozzles 52 extending downward to direct air applied under pressure to the upper plenum chambers toward the upper surface of a glass sheet that is aligned with the bottom openings of the nozzles. Opposing each upper plenum chamber 51 is a lower plenum chamber 53 provided with lower bar-type nozzle housings 54 disposed with thick walls extending vertically and having elongated openings directed upward through their thickness so that air blasts applied under pressure to the lower plenum chambers 53 are directed through the elongated openings upward against the lower major surface of the glass sheet. The array of openings of the lower bar-type nozzle housings opposes a corresponding array of openings in the upper pipe nozzles. The bar-type nozzle housings are spaced vertically below the upper pipe nozzles to provide clearance for moving a ring-like member 70 along a path between said upper nozzles and said lower nozzles. The lower ends of the rows of pipes are located along a curved surface complementary to the curved shape of the upper smooth surfaces of the bar-type housings for the lower nozzles to provide a curved clearance space therebetween conforming to the transverse shape of the glass sheets conveyed therebetween. If desired, the plenum chambers 51 and 53 are separated into discrete upper and lower chambers along the length of cooling station 14 to provide different air pressures into the various upper plenum chambers and the lower plenum chambers so as to provide a program of air blasts along the length of the cooling station 14. The illustrated apparatus has three upper and three lower plenum chambers, each subdivided into two sections. The exact numbers may vary, if desired, without departing from the gist of this invention.

The lower bar-type nozzles 54 may be interconnected to a common pivotally mounted frame (not shown). A construction similar to that disclosed and claimed in U.S. Pat. No. 3,846,106 to Samuel L. Seymour for pivoting a lower set of nozzles may be used for pivoting apparatus to rapidly remove cullet by sliding relative to the lower bar-type nozzles 54 of the illustrative embodiment of this invention. The description of this patented construction is incorporated by reference in the present application.

The spaces between the upper pipe nozzles 52 provide paths for the escape of air blasted against the upper concave surface of glass sheets treated by the apparatus described in this specification. The spaces between adjacent lower bar-type nozzle housings 54 provide paths for the escape of air blasted against the lower convex surface of said glass sheets. While more total space is provided for the escape paths above the glass than for the escape paths below the glass, the difference in total space for escape provided on opposite sides of the shaped glass sheets is helpful in providing greater uniformity of cooling of the top and bottom surfaces than would be the case if both upper and lower glass sheet surfaces had escape paths of equal size. This result follows because a convex surface is more streamlined than a concave surface. Therefore, it is more difficult to remove air applied normally against a concave surface than air applied normally against a convex surface and therefore more escape space is provided to remove air blasts that impinge against the upper concave surface than for air blasts that impinge against the lower convex surface.

The ring-like member 70 comprises a rail that extends in the form of a ring-like structure disposed edgewise with its width forming the height of the rail. Connectors 79 are attached at their inner ends to the laterally outer surface of the rail at spaced points therealong and at their outer ends to a reinforcing frame 80. Both the latter and the frame-like member 70 are shaped in outline similar to the outline shape of a supported glass sheet and in elevation similar to the curvature of the supported glass sheet.

The reinforcing frame 80 is preferably constructed of an outer steel pipe similar in outline shape to that of the ring-like member 70 and surrounds the latter in spaced relation thereto. The space between the ring-like member 70 and the reinforcing frame 80 is determined by the length of the connector means 79. A preferred construction for the ring-like member is disclosed in U.S. Pat. No. 3,973,943 to Seymour, the disclosure of which is incorporated herein by reference.

The reinforcing frame 80 is connected to a carriage 96. The carriage 96 is connected to a rack 102 on each side of the carriage 96. The racks 102 are connected to reversible pinions 104, which are actuated by a reversible drive motor (not shown). This arrangement guides the movement of the ring-like member 70 between an upstream position at shaping station 16, a downstream position in alignment with a sheet transfer means (not shown) at the downstream end of the cooling station 14 and an intermediate parking position just downstream of the shaping station. The carriage 96 is reinforced by several arcuate cross braces (not shown) shaped to conform with the transverse curved shape defined by the upper surfaces of the lower bar-type nozzle housings 54 and the lower ends of the rows of upper pipe nozzles 52 so as to be capable of moving therebetween.

The carriage 96, the ring-like member 70 and its reinforcing frame constitute shuttle means for transferring one or more bent glass sheets from the shaping station 16 to the cooling station 14 where the glass is cooled and transferred to an unloading device (not shown). The shuttle means is capable of returning to the shaping station 16 at a suitable moment in the next shaping cycle. During cooling, the carriage is reciprocated to avoid an iridescent pattern in the glass sheet.

An elongated housing 62 extends across the width of the apparatus between the shaping station 16 and the cooling station 14. The roof of the housing 62 tapers upwardly and inwardly to provide a narrow slot extending across the apparatus in a horizontal plane clear of the path taken by the shuttle means 70, 80, 96 when the latter moves between the shaping station 16 and the cooling station 14. Air is supplied continuously to the housing 62 at a relatively low pressure for escape upward through the narrow slot to provide a continuous air curtain that protects the mold parts somewhat from impingement by air blasts from the tempering nozzles that would tend to cause an enhanced temperature gradient along the mold parts in the direction of the path of glass sheet movement in the absence of the continuous air curtain. The air curtain is believed to be superior to a mechanical barrier that must be lifted to protect the mold parts between successive transfer operations and lowered intermittently each time the shuttle means moves through the boundary region downstream of the shaping station 16 and upstream of the cooling station 14.

A CYCLE OF OPERATION

At the beginning of a shaping cycle initiated by glass sensing element S sensing the presence of a glass sheet thereover according to the present invention, the glass sheet is conveyed into the glass shaping station 16 on conveyor rolls 18 and 19 with the lower lifting mold 34 disposed in a retracted position with its upward facing shaping surface 22 entirely below the upper support surface provided by the conveyor rolls 19 and the upper vacuum mold 36 having its apertured lower refractory wall member 38 spaced a short distance above the upper surface of the glass sheet. The latter travels until it reaches a position of alignment between the lower mold 34 and the upper vacuum mold 36. When the glass sheet is initially shaped to a non-uniform curve about an axis extending substantially parallel to the direction of glass sheet movement defined by the conveyor rolls 18 and 19, the exact moment that the lower mold 34 is actuated is determined by the depth of bend transverse to the longitudinal axis of the path of glass movement.

As the glass sheet arrives at the shaping station 16, a timer initiated by sensing element S actuates piston(s) 28 and causes vacuum to be applied to the upper vacuum mold 36 as the lower lifting mold 34 is lifted. The glass sheet is lifted on the lower mold 34 into a position in the vicinity of the upper vacuum mold 36. The latter is initially supported in closely spaced relation (several glass sheet thicknesses) above the upper tangent common to conveyor rolls 19. Since the glass sheet is hot when it arrives at the shaping station, it readily sags by gravity to conform to the relatively sharp curvature of the upwardly facing surface of end land 25 and of the upwardly facing shaping surfaces 22 of the shaped lands 23 near the end land 25 when the mold 34 lifts the soft glass sheet into a position in close adjacency to the downward facing shaping surface of the lower apertured wall 38 of the upper vacuum mold 32. The glass sheet is lifted into close adjacency to the upper vacuum mold 32 by limiting the extent of upward movement of piston(s) 28, and before the glass sheet is simultaneously engaged between the upward facing shaping surfaces of the lands 23 and end land 25 of the lower mold 34 and downward facing shaping surface of the upper vacuum mold 32, suction lifts the shaped glass sheet so that the glass sheet is brought into engagement with the lower refractory wall member 38 of the upper vacuum mold 32. The shape defined by the downward facing shaping surface of the upper vacuum mold 32 is similar to the upward facing shaping surface defined by the transversely extending lands 23 and the end land 25 of the lower mold 32.

Lower mold 34 has been lifted in response to the sensing element S actuating a timer circuit (not shown) that extends the piston(s) 28 in timed sequence after sensing the passage of the glass sheet over the sensing element S. The timer also controls the onset of the return of the lower lifting mold to its recessed position. The latter timer is timed to insure that the return of the lower lifting mold 34 by retraction of piston(s) 28 is coordinated with the time that the glass sheet is engaged by suction against the lower refractory wall member 38 of the upper vacuum mold 32. The timer also initiates the upward retraction of vertical piston 43 which causes lifting of the upper vacuum mold 32 simultaneously with the downward movement of the lower mold 34. Vacuum is continued as the upper vacuum mold rises so as to cause the upper surface of the glass sheet to conform exactly to the downwardly facing shaping surface of the lower refractory wall member 38 of the upper vacuum mold 32.

When the upper vacuum mold 32 reaches its upper position, the shaping station is now ready to receive the ring-like member 70 into position between the upper vacuum mold 32 and the lower lifting mold 34. The carriage 96 stops with the ring-like member 70 at its aforesaid upstream position directly below the upper vacuum mold 32. At the same time, when the ring-like member 70 occupies its upstream position immediately below the upper vacuum mold 32, the vacuum in upper vacuum mold 32 is released, thereby permitting the shaped glass sheet to be deposited onto the ring-like member 70.

The shape of the ring-like member transverse to the path of movement, and particularly its transversely extending portion, may have the same curvature or a slightly different curvature from that defined by the downwardly facing shaping surface of the upper vacuum mold 32.

The glass sheet supported on the ring-like member 70 is transferred to the cooling station 14 where air under pressure is applied through the downward facing nozzles 52 extending from the upper plenum chambers 51 and through the orifices of the lower bar-type nozzles 54 extending upward from the lower plenum chambers 53 to cool the glass as rapidly as possible to impart at least a partial temper thereto.

The ring-like member 70 transports the bent glass sheet through the cooling station 14. When it arrives at its most downstream position at the downstream end of the cooling station 14, the reversible pinions 104 stop rotating. At this time, a glass sheet transfer device (not shown) has begun to transfer the glass sheet from the ring-like member 70 toward an unloading conveyor (not shown). At a proper time, the timer controls the onset of the reverse rotation of the reversible pinions 104 that control the return movement of the racks 102 and their attached ring-like member 70 in an upstream direction to either a parking position immediately downstream of the shaping station or directly into the shaping station.

The need for imparting an exact shape to the glass sheet, particularly around its peripheral portion where the shaped glass sheet is mounted against a shaped glazing frame makes it desirable to use a lifting mold that engages the glass sheet in such a manner that it provides elongated support for the glass sheet along at least the most critical regions of its peripheral edge portion. When a glass sheet is required to develop a complicated shape having a relatively sharply bent portion adjacent one side of the bent sheet, the lifting mold is provided with an elongated end slat having an upper edge surface that is continuous and has a shape that conforms to the relatively sharply bent edge portion of the shaped sheet and that forms a continuation of the interrupted shaping surface formed on the upper edge surface of the shaping lands that extend transverse to the length of the elongated end slat. A lifting mold so constructed applies a continuous elongated area of support along the peripheral edge protion where conformance to desired shape is most critical. The heat softened sheet develops a proper shape along its critical peripheral portion during the lifting step and need not depend upon any subsequent shaping that occurs during vacuum engagement or upon transfer to or support by the ring-like member to correct an improper shape component.

As a consequence, the present apparatus minimizes a wavy structure or "pie crust" along the critical edge portion of a bent sheet that develops due to support of the sheet on spaced slats when the sheet is at an elevated temperature most susceptible to deformation.

While the invention described thus far relates to shaping glass sheets to complicated shapes having sharply bent portions to one side thereof, it is within the gist of this invention to provide a second elongated end slat to provide continuous engagement for the peripheral side edge portion of the sheet to be shaped opposite the side engaged by the first named elongated end slat. The second elongated end slat, like the first elongated end slat, is continuous in length and shaped transversely to form a continuation of the other ends of the transverse slats whose upwardly facing shaping surfaces form the shaping surface of the lower lifting mold. Both elongated end slats in such a construction are slotted vertically to provide clearance for moving the lifting mold between the lower retracted position of the lifting mold and the raised position in which the entire shaping surface 22 is above the upper tangential plane defined by the conveyor rolls 19.

The form of the invention shown and described in this disclosure represents an illustrative preferred embodiment and various modifications thereof. It is understood that various changes may be made without departing from the gist of the invention except insofar as defined in the claimed subject matter that follows.

What is claimed is:

1. A method of shaping a sheet of heat deformable material to a shape including a sharply bent edge portion near a longitudinal edge thereof comprising:
    heating said sheet to its deformation temperature; and
    lifting said heat softened sheet by engaging portions of said sheet other than said longitudinal edge with transversely extending longitudinally spaced shaping members each having an upper surface that contacts said sheet in a transverse direction, while engaging said longitudinal edge with a continuous longitudinally extending elongated shaping member positioned adjacent to an end of each of said spaced shaping members and having an upper surface that fully contacts said longitudinal edge of said sheet along its entire length, wherein the contours is said spaced shaping members and said continuous elongated shaping member define the shape of said sheet.

2. A method as in claim 1, further including engaging the lifted sheet by vacuum with a vacuum mold having a downward facing lower surface essentially conforming to the shape defined by the upper surfaces of said shaping members.

3. A method as in claim 2, further including conveying said sheet into a position in alignment over said shaping members on a series of longitudinally spaced, transversely extending conveyor rolls of cylindrical configuration located in vertical planes intermediate positions occupied by said transversely extending spaced shaping members.

4. A method as in claim 2, further including transferring said sheet from said vacuum mold to a ring-like member, conveying said sheet on said ring-like member into a cooling station and applying cool tempering medium toward said sheet at a rate sufficient to impart a desired temper in the sheet.

5. A method as in claim 1, wherein said sheet is composed of glass.

6. An apparatus for shaping sheets of heat deformable material comprising:
    a plurality of transversely extending longitudinally spaced shaping slats each having a longitudinal axis, the upper facing surface of said slats defining the transverse shape of said sheet to be shaped;
    a continuous elongated end member have a longitudinal axis, the continuous upward facing surface of said end member defining the curvature of a longitudinal edge of said sheet to be shaped along its entire length;
    means for mounting said member adjacent to an end portion of each of said slats with the longitudinal axis of said slats generally parallel to one another and transverse to the longitudinal axis of said end member to provide a shaping device such that said upward facing surfaces of said slats and said end member form the desired contour of said sheet to be shaped; and
    means to move said shaping device into engagement with said sheet to be shaped.

7. Apparatus as in claim 6 wherein said end member is in substantially abutting relation with each of said end portions of said slats.

8. Apparatus as in claim 7 further characterized by said transversely extending slats defining a shape that includes a region of relatively sharp bending near said end portion of said slats in substantially abutting relation with said continuous, elongated end member, and said end member has an upwardly facing surface that is curved transversely of its length to form a smooth continuation of said region of sharp bending.

9. Apparatus as in claim 8, wherein said shaping device is a lower lifting mold and further including a transversely extending conveyor roll in the space between each adjacent pair of said transversely extending shaping slats, further characterized by each conveyor roll having a shaft of reduced diameter extending from each end thereof, and a different vertically extending slot for said continuous, elongated end member in spaced relation below the upper surface of said elongated end member for receiving said shaft of reduced diameter at one end of each said conveyor roll, the vertical dimension of said slots being so constructed and arranged relative to the upper surface of said end member and the difference in diameter between said shaft of reduced diameter and that of said conveyor roll being such that said lower lifting mold is free to move between a lowered position entirely below an upward tangent common to said conveyor rolls and a raised position where said upwardly facing surfaces are above said upper tangent.

10. Apparatus as in claim 9, wherein the ends of said transversely extending member away from said longitudinally extending end slat are interconnected at their lower portions only by an interconnecting wall sufficiently low to allow said lifting mold said freedom to move.

11. Apparatus as in claim 8, further characterized by said elongated end member having an upper surface that is shaped transversely of its length to define at least a portion of said region of relatively sharp bending that merges into the shape defined along the inner end of each of said transversely extending slats.

12. Apparatus as in claim 11, further including a vacuum mold having a downwardly facing shaping surface corresponding to the upwardly facing shaping surface of said lower lifting mold and said means to move said shaping device includes means for raising and lowering said lower lifting mold between the raised position and the lowered position, further characterized by means guiding the position of said lower lifting mold as the latter is raised and lowered to insure that said lower lifting mold remains in alignment with said upper lifting mold.

13. Apparatus as in claim 12, wherein the ends of said transversely extending member away from said longitudinally extending end slat are interconnected at their lower portions only by an interconnecting wall sufficiently low to allow said lower lifting mold said freedom to move.

* * * * *

UNITED STATES PATENT AND TRADEMARK OFFICE
CERTIFICATE OF CORRECTION

PATENT NO.    :   4,518,411

DATED         :   May 21, 1985

INVENTOR(S)   :   Robert G. Frank, Michael T. Fecik and George R. Claassen

It is certified that error appears in the above-identified patent and that said Letters Patent is hereby corrected as shown below:

Column 14, line 54, "member" should be --slats--.

Column 14, line 55, "slat" should be --member--.

Column 16, line 1, "member" should be --slats--.

Column 16, line 2, "slat" should be --member--.

Signed and Sealed this

Third Day of September 1985

[SEAL]

Attest:

DONALD J. QUIGG

*Attesting Officer*    *Acting Commissioner of Patents and Trademarks - Designate*